No. 654,222.  
Patented July 24, 1900.
H. BUBE.
CAP FOR MEASURING SCALES.
(Application filed July 19, 1898.)
(No Model.)
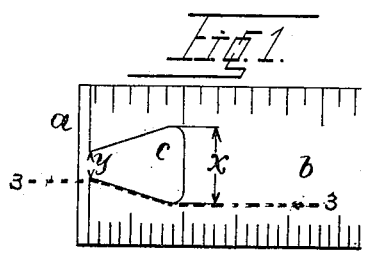
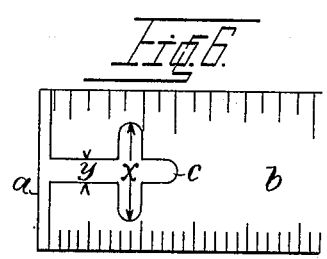
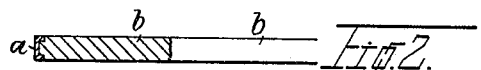
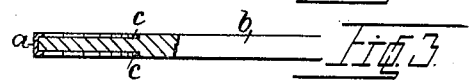
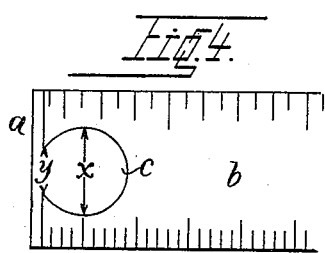
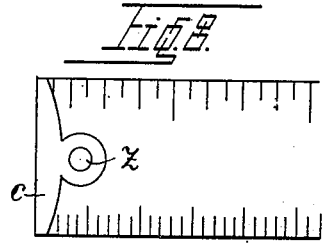
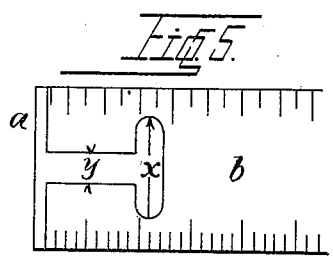
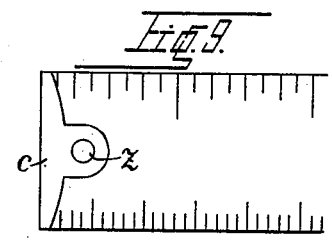
Witnesses  
Inventor  
Hans Bube  
By Hewson & Hewson  
his Attys.

UNITED STATES PATENT OFFICE.

HANS BUBE, OF HANOVER, GERMANY.

CAP FOR MEASURING-SCALES.

SPECIFICATION forming part of Letters Patent No. 654,222, dated July 24, 1900.

Application filed July 19, 1898. Serial No. 686,378. (No model.)

*To all whom it may concern:*

Be it known that I, HANS BUBE, manufacturer, a subject of the German Emperor, and a resident of Hanover, Germany, have invented certain new and useful Improvements in Scale-Caps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide a measuring rule and scale with a protecting end cap or cover which is simple in construction and has a better hold on the rule or scale than those heretofore used and which at the same time in no way interferes with the reading of the scale. For this purpose my scale-cap is made with very narrow flanges and in its preferred shape not broader than the smallest division on the scale. It is fastened to the rule or scale by means of special lugs, and rivets are unnecessary.

In the accompanying drawings, Figure 1 is a plan view of one end of the rule or scale provided with one form of my improved cap. Fig. 2 is a side view, partly in section; and Fig 3 is a longitudinal section drawn on the line 3 3 of Fig. 1. Figs. 4 to 9, inclusive, illustrate modifications.

The cap is bent from a strip $a$, of iron or other metal or material, into U-section and is slipped over the end of the scale $b$, which is suitably reduced in shape so that the cap will be flush with its outer surface.

The rectangular bent flanges of the cap $a$ are preferably not broader than the smallest division of the scale in order not to cover the lines of division, and they are provided with lugs $c$, which are narrower than the cap is long. These lugs are sunk into grooves of corresponding shape and serve to prevent loosening and pulling off of the cap. For this purpose the lugs are made broader at their ends, so as to form a dovetail connection, which makes the employment of rivets unnecessary. The lugs may vary as to their shape as long as an interlocking connection is provided between the material of the rule or scale and the lugs. In the cap shown in Fig. 1 the lugs are for this reason dovetailed, and in the modifications shown in Figs. 4 to 7, inclusive, the lugs have other shapes, which, however, are merely shown as examples, since many other shapes may be devised without departing from the nature of this invention.

In the cap shown in Fig. 4 the lug is circular, the part $x$ being thus broader than the part $y$.

The lug shown in Fig. 5 has the shape of a T and in Fig. 6 the shape of a cross, in both instances a part $x$ being present, which is considerably broader than the part $y$. The lugs $c$ may also be toothed or serrated at the edges, as shown in Fig. 7, which also gives a good interlocking means.

The lugs $c$ are in all cases not so broad as to cover the lines of division or graduation of the scale.

In order to strengthen the cap, its flanges may have the shape shown in Figs. 8 and 9—that is, broader near the center than at their ends.

When it is desired to give the cap a better grip on the scale, the lugs besides being provided with projections on their edges may be provided with holes, into which projections $z$ on the scale engage, as shown in Fig. 8. When holes of this description are made use of, with which corresponding projections engage, it is not necessary that the edges of the lugs interlock with the material of the scale should it be desired to omit such interlocking part, as for special kinds of division, or for want of space, or for other reasons. Such a cap is illustrated in Fig. 9.

I claim as my invention—

1. A scale having a protecting-cap bent into U-section embracing the end of the scale and provided with fastening-lugs on opposite sides sunk into the material of the scale and interlocking with the same so as to prevent displacement in any direction, said lugs projecting in the same plane with the opposite surfaces of, and flush with, the scale, whereby said cap may be secured to the scale without rivets or other independent fastening means, substantially as described.

2. A scale having a protecting-cap bent into U-section embracing the end of the scale but of such breadth as not to surpass the smallest division of the scale, and provided with fastening-lugs on opposite sides sunk into the material of the scale and interlocking with the same so as to prevent displacement in any direction, said lugs projecting in the same plane with the opposite surfaces of, and flush with, the scale, whereby the said cap may be secured to the scale without rivets or other independent fastening means, substantially as described.

In testimony that I claim the foregoing as my invention I have signed my name in presence of two subscribing witnesses.

HANS BUBE.

Witnesses:
OTTO W. HELLMIECH,
E. H. L. MUMMENHOFF.